US010091452B2

United States Patent
Lee

(10) Patent No.: US 10,091,452 B2
(45) Date of Patent: Oct. 2, 2018

(54) ELECTRONIC DEVICE AND METHOD FOR RECORDING AND DISPLAYING SCRIPT

(71) Applicant: Chiun Mai Communication Systems, Inc., New Taipei (TW)

(72) Inventor: Ko-Han Lee, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 138 days.

(21) Appl. No.: 14/969,166

(22) Filed: Dec. 15, 2015

(65) Prior Publication Data
US 2016/0191845 A1    Jun. 30, 2016

(30) Foreign Application Priority Data
Dec. 31, 2014   (CN) .......................... 2014 1 0856652

(51) Int. Cl.
*H04N 5/77*     (2006.01)
*G11B 27/10*    (2006.01)

(52) U.S. Cl.
CPC ............... *H04N 5/77* (2013.01); *G11B 27/10* (2013.01); *H04N 5/772* (2013.01)

(58) Field of Classification Search
CPC ........... H04N 5/77; H04N 5/772; G11B 27/10

USPC .......................................................... 386/228
See application file for complete search history.

(56) References Cited

U.S. PATENT DOCUMENTS

| | | | | | |
|---|---|---|---|---|---|
| 4,358,797 | A | * | 11/1982 | Nishijima | G11B 15/1808 360/73.13 |
| 2005/0030391 | A1 | * | 2/2005 | Ishii | H04N 5/772 348/231.99 |
| 2015/0244758 | A1 | * | 8/2015 | Kolowich | H04L 67/2842 709/231 |

FOREIGN PATENT DOCUMENTS

| | | |
|---|---|---|
| CN | 103095752 | 5/2013 |
| CN | 102956248 | 12/2016 |
| TW | 200919392 | 5/2009 |

\* cited by examiner

*Primary Examiner* — David Harvey
(74) *Attorney, Agent, or Firm* — ScienBiziP, P.C.

(57) ABSTRACT

In a method for recording and displaying a script executed on an electronic device, the electronic device includes a camera, at least one processor, and a display device, the method including: start recording a video data of a script by the camera when receiving an operation command of recording; recording time information in the script; start recording a new video data of the script by the camera when detecting an interrupt request; stop recording the script when a stop command is detected; and publish the script to a preselected server.

15 Claims, 8 Drawing Sheets

ELECTRONIC DEVICE AND METHOD FOR RECORDING AND DISPLAYING SCRIPT

CROSS-REFERENCE TO RELATED APPLICATIONS

This application claims priority to Chinese Patent Application No. 201410856652.5 filed on Dec. 31, 2014, the contents of which are incorporated by reference herein in its entirety.

FIELD

The subject matter herein generally relates to information processing technology, and more particularly to an electronic device and a method for recording and displaying a script.

BACKGROUND

An electronic device (e.g., a smart phone or a tablet computer) can be used for conveniently communicating and expressing information. However, it is complex to make a complete script, and inconvenient to edit when the script is finished.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
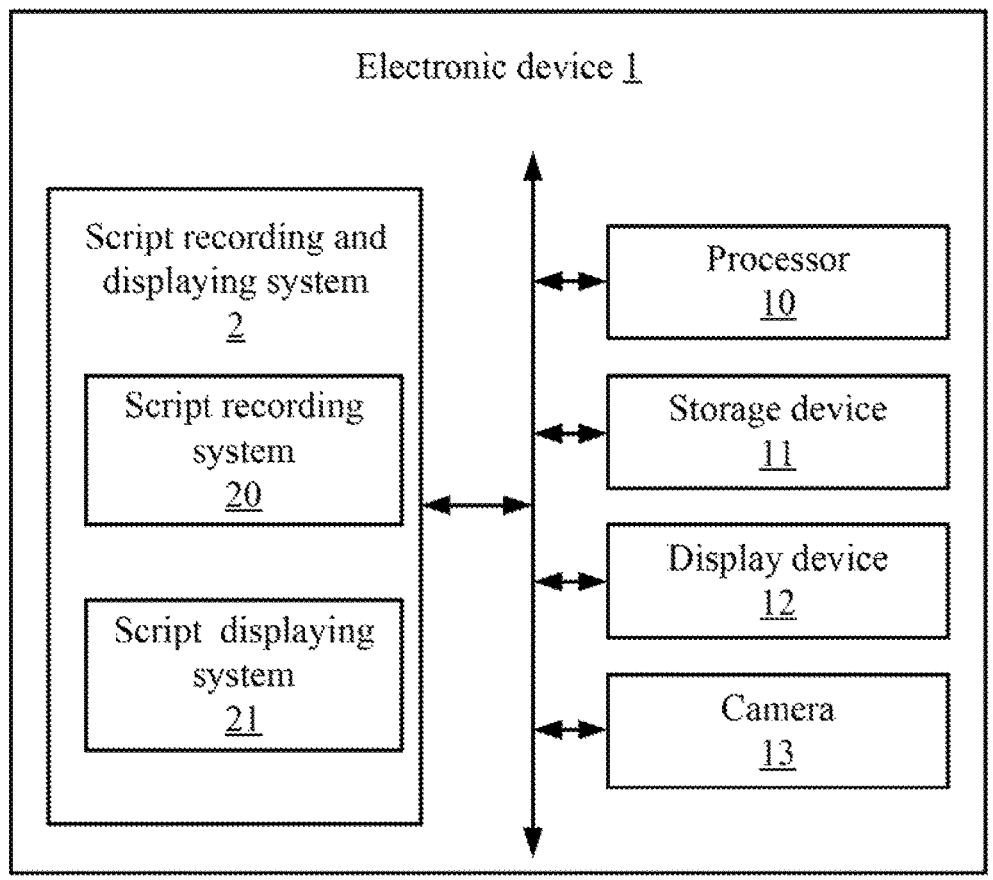
FIG. 1 is a block diagram of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 illustrates a block diagram of one embodiment of an electronic device. In at least one embodiment, as shown in FIG. 1, an electronic device 1 includes, but is not limited to, at least one processor 10, a storage device 11, a display device 12, a camera 13, and a script recording and displaying system 2. The electronic device 1 can be a tablet computer, a smart phone, a personal digital assistant (PDA), a mini computer, a digital television, or any other electronic device capable of the displaying device 12. FIG. 1 illustrates only one example of the electronic device 1 that can include more or fewer components than as illustrated, or have a different configuration of the various components in other embodiments.

In at least one embodiment, the at least one processor 10 can be a central processing unit (CPU), a microprocessor, or other data processor chip that performs function of the script recording and displaying system 2 in the electronic device 1. The at least one processor 10 is connected to the display device 12 and the storage device 11 via a data bus.

In at least one embodiment, the storage device 11 can include various types of non-transitory computer-readable storage medium. For example, the storage device 11 can be an internal storage system, such as a flash memory, a random access memory (RAM) for temporary storage of information, and/or a read-only memory (ROM) for permanent storage of information. The storage device 11 can also be an external storage system, such as a hard disk, a storage card, or a data storage medium.

The display device 12 can provide a human-computer interaction interface, for example, a user interface of script 3. The display device 12 can receive operational commands to control the electronic device 1, for example, touches or text operations input by a user. The display device 12 can be a touch screen, which supports multi-touches on virtual icons or physics buttons. In one embodiment, if the electronic device 1 is a digital TV, the display device 12 can receive an operation of a remote-control unit corresponding to the digital TV.

The camera 13 can be an image capturing device, for example, a digital video camera. In some embodiments, the camera 13 can be inbuilt in the electronic device 1. For example, the camera 13 is located at the top of a frontal panel of the electronic device 1. In some embodiments, the camera 13 can be an external device connected to the electronic device 1 via a wireless connection (e.g., a WIFI™ connection or a BLUETOOTH™ connection) or a cable (e.g., a universal serial bus cable). The camera 13 can be used to capture images in front of the display device 12.

In at least one embodiment, the script recording and displaying system 2 can be divided into two parts: a script recording system 20 and a script displaying system 21. The script recording system 20 can record a script, and the script displaying system 21 can display a predetermined script. In some embodiments, the script recording and displaying system 2 can be used in many situations, for example, dance teaching, cooking teaching, game teaching, working instruction and monitoring a production line, teaching software, entertainment and so on.

Figure 2:
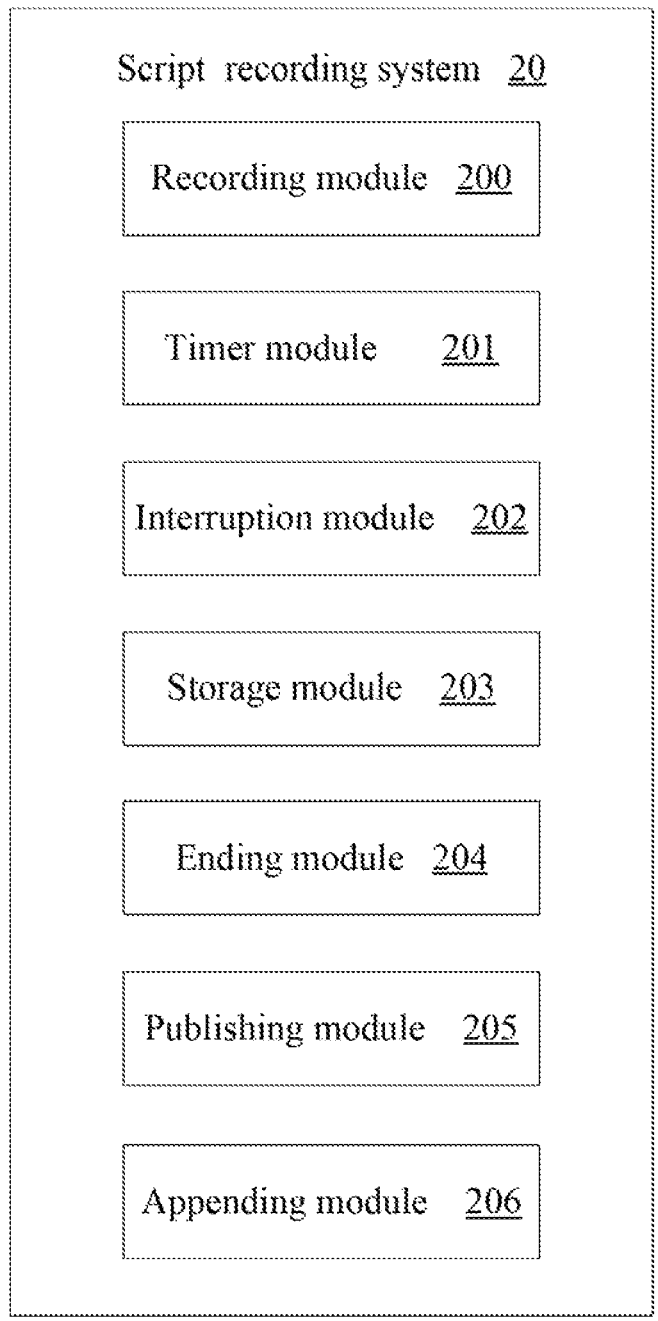
FIG. 2 is a block diagram of one embodiment of function modules of a script recording system in the electronic device in FIG. 1.

FIG. 2 is a block diagram of one embodiment of modules of a script recording system. In at least one embodiment, the script recording system 20 can include a recording module 200, a timer module 201, an interruption module 202, a storage module 203, an ending module 204, a publishing module 205 and an appending module 206. The modules 200-206 can include computerized codes in the form of one or more programs, which are stored in the storage device 11 of the electronic device 1. The at least one processor 10 executes the computerized codes to provide functions of the function modules.

The recording module 200 can start to activate the camera 13 to record a video data when receiving an operation command of recording from a user. A script is a complete temporal event including a plurality of video data arranged in order of time of recording. Each of the video data can be a video file, a storage address of a video file, a picture, a text description, video icon, or a corollary component such as an audio file or time information.

Figure 5:
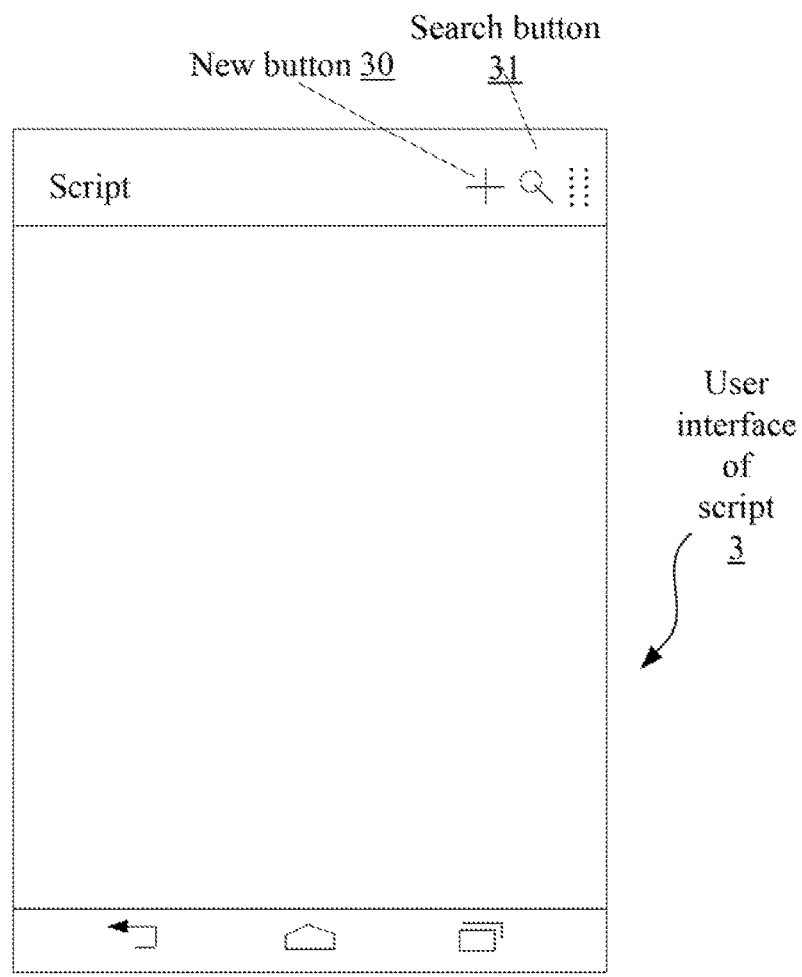
FIG. 5 is a diagrammatic view of an example embodiment of a user interface.
Figure 6:
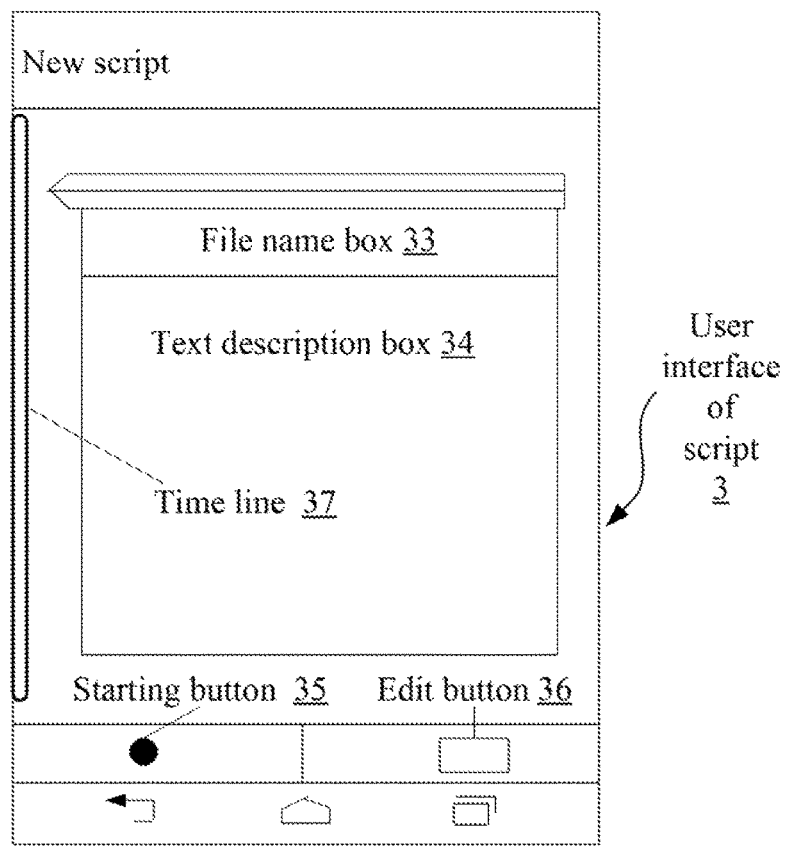
FIG. 6 is a diagrammatic view of an example embodiment of recording a new script.

In some embodiments, when the user inputs the operation command of recording, the user can firstly touches the user interface of script 3 on the display device 12. As shown in FIG. 5, the user interface of script 3 can include, but is not limited to, a new button 30, a search button 31, an edit button 36, and a time line 37. When the "new button" 30 is triggered, the display device 12 can display a new user interface of script 3. When the "search button" 31 is triggered, the display device 12 can display a script corresponding to a keyword or key words input by the user. The user can input a text description to explain the script. As shown in FIG. 6, a file name box 33 can be used to type in a file name of the video data, and a text description box 34 can be used to enter a simple introduction of the video data. In some embodiments, the file name is associated with the video data to be recorded, to summarize the content of the video data and disclose specific time and an order of recording the video data. A format of the file name can be as "YYYYM-MDD-HHMM-XX" (year/month/day-time-number). For example, a file name as "20141225-1023-01" which means that the video data is a first video data of a script recorded on Dec. 25, 2014, at 10:23. When the "edit button" 36 is triggered, the text description can be re-edited.

When the "start button" 35 on the user interface of script 3 is triggered, the recording module 200 can activate the camera 13 to record scene in front of the display device 12. In some embodiments, the camera 13 can be activated after a predetermined time (e.g., five seconds) when the new button 30 is triggered, then the user can have enough time to prepare.

In some embodiments, the recording module 200 can also execute adding pictures after the camera 13 recording a video file. The pictures can be from a picture database stored in the storage device 11, or taken by the camera 13.

The timer module 201 can record time information in the script. The time information can include a start time and an end time of recording of each video data, a prompt message at the end time, and a time interval between each two of the video data.

The interruption module 202 can start to record a new video data when an interrupt request is detected.

In some embodiments, the interrupt request can be a triggering action of touching the new button 30 by the user for a second time. When recording the second video data, time recorded on the time line 37 can increase. It should be emphasis that, when the new button 30 touched by the user for a second time, the first video data can be recoded completely, and the second video data can be started to record.

The storage module 203 can store the video data in the storage device 11 according to an order of recording the video data.

The ending module 204 can stop recording video data when a stop command is detected. In some embodiments, the stop command can be a trigger action of the user touching the start button 35 for a second time.

The publishing module 205 can publish a script to a preselected server to share. The script can include at least one video data, for example, the first video data and the second video data.

In some embodiments, the script can be published via E-mail, file sharing, uploading, or FTP, or a third-party instant messaging software, such as: QQ, MSN, etc. The script stored in the local database can be sent to an Internet server, then the Internet server can distribute the script.

The appending module 206 can provide additional functions for users, when the recording module 200 have being record the video data. The additional functions can include control the pictures to change according to gestures for example, when the user views pictures, a next one can be displayed when a hand is moved from right to left, or a previous one can be displayed when a hand is moved from left to right.

Taking a script of baking bread as an example. The recording module 200 detects the new button 30 and the start button 35 are triggered in turn. After five seconds, the recording module 200 activates the camera 13 to record a first video data. Contents of the first video data can comprise: first, putting all ingredients in a bread machine; second, pressing a dough kneading button of the bread machine. When the user needs to prepare black sesame, the user touches the new button 30 again, then the interruption module 202 detects a interrupt request. After five seconds, the interruption module 202 activates the camera 13 to record a second video data. Contents of the second video data is that the black sesame is being stirred. Throughout the process, the timer module 201 records time information, such as a start time of putting all ingredients in the bread machine, a time of the new buttons 30 triggered for the second time, an end time of cooking the black sesame, and a prompt message at the end time (e.g., the black sesame are ready).

Figure 3:
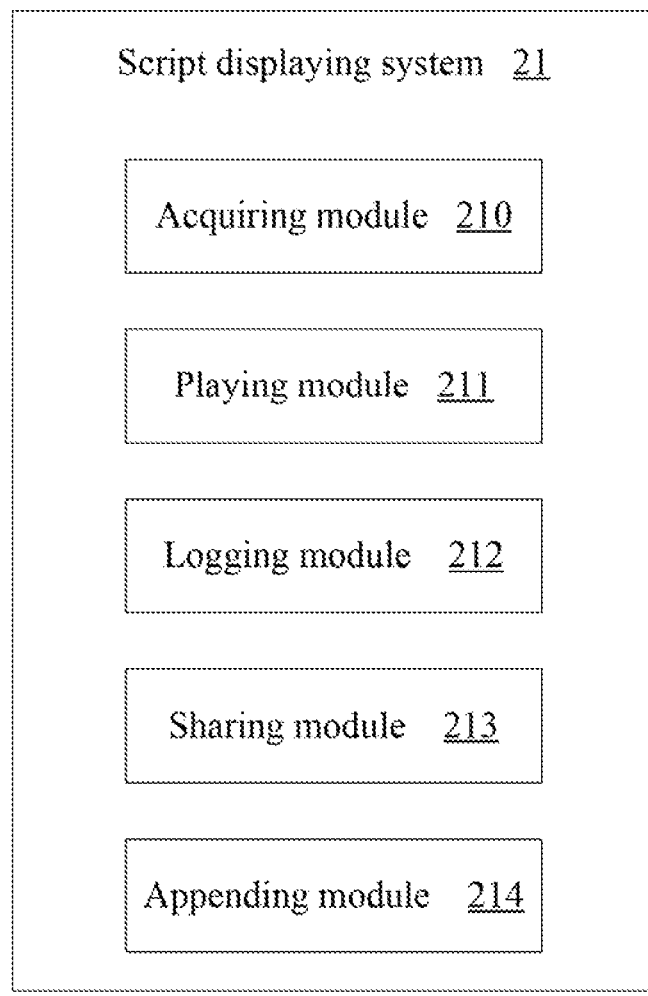
FIG. 3 is a block diagram of one embodiment of function modules of a script displaying system in the electronic device in FIG. 1.

FIG. 3 is a block diagram of one embodiment of modules of a script displaying system. In at least one embodiment, the script displaying system 21 can include a acquiring module 210, a display module 211, a logging module 212, a sharing module 213, and an appending module 214. The modules 210-214 can include computerized codes in the form of one or more programs, which are stored in the storage device 11 of the electronic device 1. The at least one processor 10 executes the computerized codes to provide functions of the function modules.

The acquiring module 210 can acquire a prerecorded script. The prerecorded script is a complete temporal event including a plurality of video data arranged in order of time of recording. Each of the video data can be a video file, a picture, a text description, a video icon, or a corollary component such as an audio file and time information, or a memory address that stores a video file.

The prerecorded script can be downloaded from an Internet server or a local system. The prerecorded script can also be received from another electronic device 1, or copied from another storage device 11 (memory card or secure digital card). The prerecorded script is acquired by way of example, as there are a variety of ways to carry out the embodiments.

The display module 211 can display the acquired script.

Figure 8:
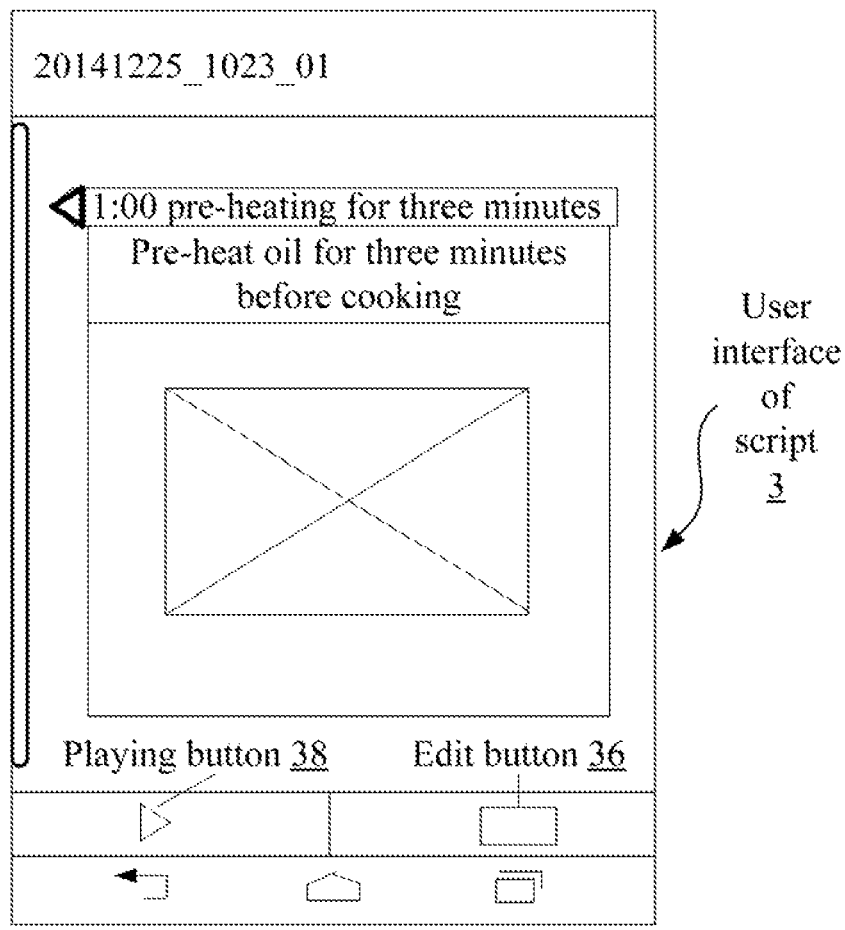
FIG. 8 is a diagrammatic view of an example embodiment of a displaying icon.

As shown in FIG. 8, when a displaying button 38 is pressed, the acquired script can be displayed on the display device 12. The time information on the time line 37 can be displayed. A file name typed in the file name box 33 can be displayed. A simple introduction about the video data can be displayed in the text description box 34. Pictures added into the script can be displayed as well.

The electronic device 1 will completely display the video data of the script according to a chronological order. That is to say, when a current video data is over, a next video data is displayed directly without a switching action. In some embodiments, before the end of the current video data, the display module 211 can remind the user with the time information. For example, three seconds before the end of the current video data, emitting a ring to remind the user that the next video data will be displayed.

The logging module 212 can log user operations during the period when the user views the script.

The user operations can comprise pausing, dragging a progress bar, repeated playing of the script and an evaluation after viewing the script. The evaluation can be, for example, perfect, failure to learn, need to practice more. The logging module 212 can store the user operations in the storage device 11, to self-examination, statistics, or social sharing.

The sharing module 213 can share the user operations with others.

Under a condition of a network connection, the user can send the user operation stored in the storage device 11 to a server or other electronic device 1. For example, the user wants to practice yoga according to a script of yoga, the users can communicate with each other about an operation experience of practicing yoga. If the user completes a step of yoga, the user can press the "success" button, and tell others how to complete this step. If the user is not doing very well, the user can press the "practice" button, and send a result to a sharing platform, to acquire a help of how to improve.

The appending module 214 can provide additional functions for users. The additional functions can include a search function, a delete function and a text-to-speech function. The text-to-speech function can read out time information, the file name and the simple introductions. The search function can help the user to search a script. The delete function can delete multiple video data or delete all of the video data.

Figure 4:
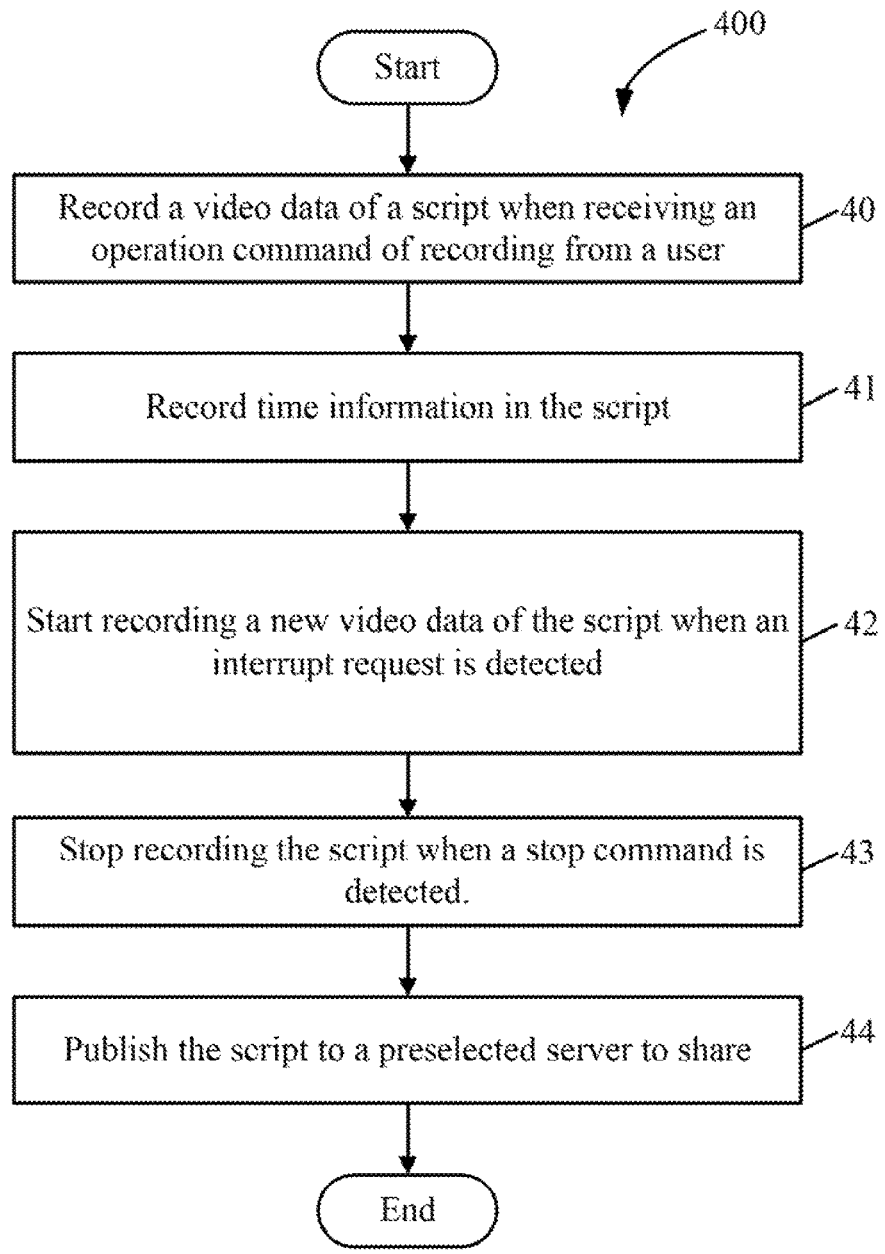
FIG. 4 illustrates a flowchart of one embodiment of a method for recording a script using the electronic device in FIG. 1.

Referring to FIG. 4, a flowchart is presented in accordance with an exemplary embodiment. An exemplary method 400 is provided by way of example, as there are a variety of ways to carry out the method. The exemplary method 400 described below can be carried out using the configurations illustrated in FIG. 1 and FIG. 2, for example, and various elements of these figures are referenced in explaining exemplary method 400. Each block shown in FIG. 4 represents one or more processes, methods, or subroutines, carried out in the exemplary method 400. Furthermore, the illustrated order of blocks is by example only and the order of the blocks can be changed. The exemplary method 400 can begin at block 40. Depending on the embodiment, additional blocks can be added, others removed, and the ordering of the blocks can be changed.

At block 40, a recording module starts to activate the camera 13 to record a video data of a script when receiving an operation command of recording from a user.

At block 41, a timer module records time information in the script.

At block 42, an interruption module starts recording a new video data of the script when an interrupt request is detected.

At block 43, an ending module stops recording the script when a stop command is detected.

At block 44, a publishing module publishes the script to a preselected server to share.

Figure 7:
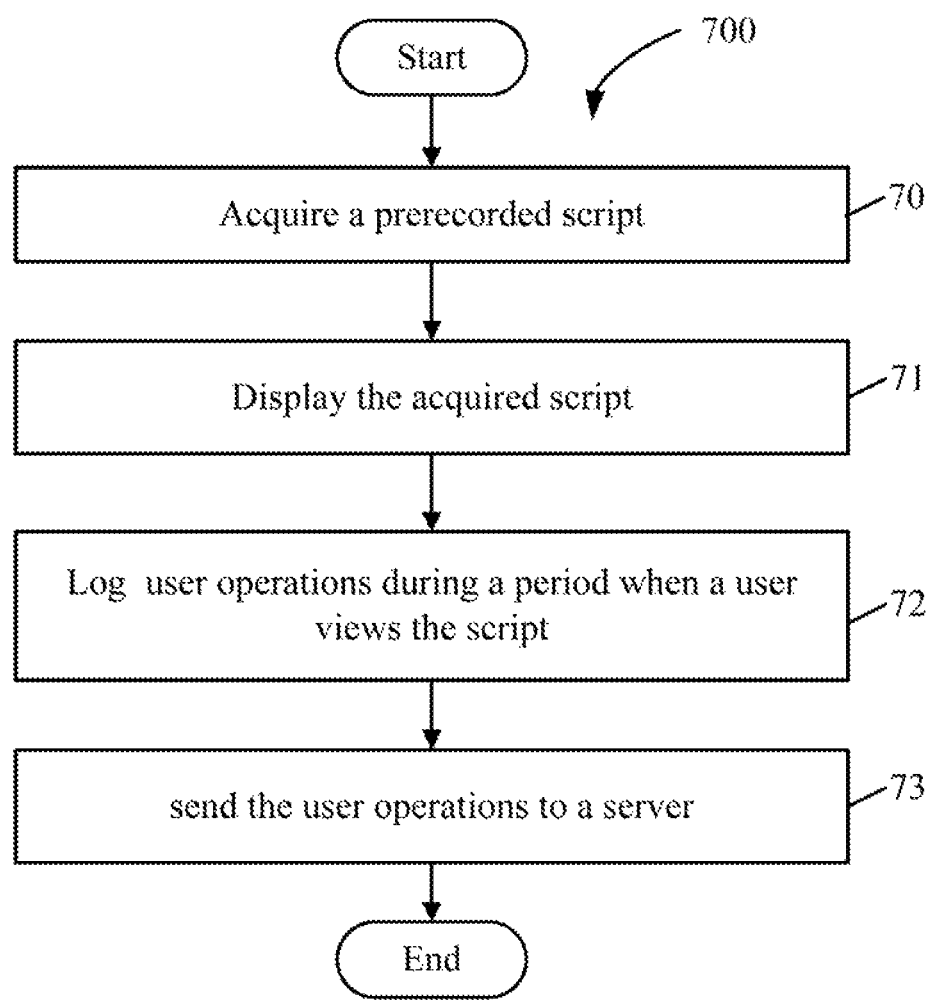
FIG. 7 illustrates a flowchart of one embodiment of a method for displaying a script using the electronic device in FIG. 1.

Referring to FIG. 7, a flowchart is presented in accordance with an example embodiment. An exemplary method 700 is provided by way of example, as there are a variety of ways to carry out the method. The exemplary method 700 described below can be carried out using the configurations illustrated in FIG. 1 and FIG. 3, for example, and various elements of these figures are referenced in explaining exemplary method 700. Each block shown in FIG. 7 represents one or more processes, methods, or subroutines, carried out in the exemplary method 700. Furthermore, the illustrated order of blocks is by example only and the order of the blocks can be changed. The exemplary method 700 can begin at block 70. Depending on the embodiment, additional blocks can be added, others removed, and the ordering of the blocks can be changed.

At block 70, an acquiring module acquires a prerecorded script.

At block 71, a displaying module displays the acquired script.

At block 72, a logging module logs user operations during a period when the user views the script.

At block 73, a sharing module sends the user operations to a server to share the user operations with others.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device for recording a multimedia script, comprising:
   at least one processor;
   a camera coupled to the at least one processor;
   a display device coupled to the at least one processor;

a storage device storing one or more programs that, when executed by the at least one processor, causes the at least one processor to:
- start recording of first video data of the multimedia script by the camera when the receipt of an operation command of recording is detected,
- stop recording of the first video data and start recording a next video data of the multimedia script by the camera when receipt of an interrupt request is detected;
- record time information within the recorded multimedia script;
- stop recording the multimedia script when a receipt of a stop command is detected;
- and publish the recorded multimedia script to a preselected server;
- wherein the device further comprises a search function, a delete function, a text-to-speech function and a gesture control function that are selectively applied to the processing of the multimedia script.

2. The electronic device according to claim 1, wherein the script is a complete temporal event including a plurality of video data arranged in order of time of recording, and each of the video data is a video file, a storage address of the video file, a picture, a text description, an audio file or time information.

3. The electronic device according to claim 2, wherein the time information comprises a start time, an end time of recording of each of the video data, a prompt message at the end time, and a time interval between each two of the video data.

4. The electronic device according to claim 1, wherein the at least one processor is further caused to:
- acquire a prerecorded script;
- display the acquired script;
- log user operations during a period when a user views the script; and
- send the user operations to a server.

5. The electronic device according to claim 4, wherein the user operations comprise pausing, dragging a progress bar, repeated playing of the script and an evaluation after viewing the script.

6. A multimedia script recording and displaying method executed on an electronic device, the electronic device comprising a camera, at least one processor, and a display device, the recording method comprising:
- starting recording of first video data of the multimedia script by the camera when receipt of an operation command of recording is detected,
- stopping recording of the first video data and starting recording a next video data of the multimedia script by the camera when receipt of an interrupt request is detected;
- recording time information within the multimedia script;
- stopping recording the multimedia script when receipt of a stop command is detected; and
- publishing the recorded multimedia script to a preselected server;
wherein the device further comprises a search function, a delete function, a text-to-speech function and a gesture control function that are selectively applied, by the method, to the processing of the multimedia script.

7. The method according to claim 6, wherein the script is a complete temporal event including a plurality of video data arranged in order of time of recording, and each of the video data is a video file, a storage address of the video file, a picture, a text description, an audio file or time information.

8. The method according to claim 7, wherein the time information comprises a start time, an end time of recording of each of the video data, a prompt message at the end time, and a time interval between each two of the video data.

9. The method according to claim 6, further comprising:
- acquiring a prerecorded script;
- displaying the acquired script;
- logging user operations during a period when a user views the script; and
- sending the user operations to a server.

10. The method according to claim 9, wherein the user operations comprise pausing, dragging a progress bar, repeated playing of the script and an evaluation after viewing the script.

11. A non-transitory storage medium having stored thereon instructions that, when executed by a processor of an electronic device, causes the processor to perform a recording method using the electronic device, the method comprising:
- starting recording of first video data of a multimedia script by the camera when receipt of an operation command of recording is detected,
- stopping recording of the first video data and starting recording a next video data of the multimedia script by the camera when receipt of an interrupt request is detected;
- recording time information within the multimedia script;
- stopping recording the multimedia script when receipt of a stop command is detected; and
- publishing the recorded multimedia script to a preselected server;
wherein the device comprises a search function, a delete function, a text-to-speech function and a gesture control function that are selectively applied, by the method, to the processing of the multimedia script.

12. The non-transitory storage medium according to claim 11, wherein the script is a complete temporal event including a plurality of video data arranged in order of time of recording, and each of the video data is a video file, a storage address of the video file, a picture, a text description, an audio file or time information.

13. The non-transitory storage medium according to claim 12, wherein the time information comprises a start time, an end time of recording of each of the video data, a prompt message at the end time, and a time interval between each two of the video data.

14. The non-transitory storage medium according to claim 11, the method further comprising:
- acquiring a prerecorded script;
- displaying the acquired script;
- logging user operations during a period when a user views the script; and
- sending the user operations to a server.

15. The non-transitory storage medium according to claim 14, wherein the user operations comprise pausing, dragging a progress bar, repeated playing of the script and an evaluation after viewing the script.

* * * * *